Jan. 23, 1945. R. D. WORTENDYKE 2,368,061
MILLING MACHINE
Filed Aug. 3, 1940 6 Sheets-Sheet 3

INVENTOR.
RAYMOND D. WORTENDYKE
BY
A. H. Parsons
ATTORNEY.

Jan. 23, 1945.  R. D. WORTENDYKE  2,368,061

MILLING MACHINE

Filed Aug. 3, 1940  6 Sheets-Sheet 4

INVENTOR.
RAYMOND D. WORTENDYKE
BY  A. H. Parsons
ATTORNEY.

Jan. 23, 1945.  R. D. WORTENDYKE  2,368,061
MILLING MACHINE
Filed Aug. 3, 1940  6 Sheets-Sheet 5

INVENTOR.
RAYMOND D. WORTENDYKE
BY
AHK Parsons
ATTORNEY.

Patented Jan. 23, 1945

2,368,061

UNITED STATES PATENT OFFICE 2,368,061

MILLING MACHINE

Raymond D. Wortendyke, Cincinnati, Ohio, assignor to The Cincinnati Milling Machine Co., Cincinnati, Ohio, a corporation of Ohio Application August 3, 1940, Serial No. 350,849

20 Claims. (Cl. 90—21.5)

This invention relates to milling machines and more particularly to improved transmission and control mechanism therefor.

One of the objects of this invention is to provide an improved transmission and control mechanism which may be readily adjusted to yield automatic cycle regulation of angularly related directions of relative movement between a cutter and a work piece.

Another object of this invention is to provide an improved control mechanism for effecting automatically sequential alternative operation of two prime movers and which is adjustable to vary each operation as respects length of time, rate and direction.

A further object of this invention is to provide an improved transmission and control mechanism which is capable of yielding various rectangular cutting paths.

Another object of this invention is to provide a control mechanism for a milling machine which will effect simultaneously an automatic reciprocating cycle between a tool support and a work support, and intermittent operation between a third support and one of the first-named supports in a path angularly related to the path of the first cycle.

Other objects and advantages of the present invention should be readily apparent by reference to the following specification, considered in conjunction with the accompanying drawings forming a part thereof and it is to be understood that any modifications may be made in the exact structural details there shown and described, within the scope of the appended claims, without departing from or exceeding the spirit of the invention.

Referring to the drawings in which like reference numerals indicate like or similar parts.

In the field of intermittent milling, which method is utilized for machining a series of non-contiguous surfaces, it is common practice to arrange the work pieces on a work support with the surfaces to be machined in alignment for successive engagement by a cutting tool during relative straight line movement between the tool support and the work support. If the surfaces are spaced a considerable distance, time is often saved by increasing the rate of relative movement to a rapid traverse rate during the period of non-cutting.

If the work piece is not too large it is possible to mount two or more of them at one time on a single work support so that during cutting on unfinished work the previously finished work may be replaced by other unfinished work, thus saving loading time. An automatic cycle by which this is accomplished is often referred to as an automatic reciprocating cycle. In such a cycle, the cutting is done during one direction of relative movement, after which the support is reversed and rapidly returned to some predetermined starting position, the cycle then being repeated with respect to a second work piece.

Some milling machines are provided with a power movable tool support as well as a power movable work support, their directions of movement, however, being angularly related whereby the path of movement of one is transverse to the path of movement of the other. Provision is made whereby either may be utilized as the moving support to effect a cutting cycle in either one of two planes, depending upon the nature of the work and the convenience of set-up.

In the machine of this invention a control mechanism is contemplated whereby cycles in two different planes may be combined into one cycle under automatic control, so that a series of aligned non-contiguous surfaces may be milled by the intermittent reciprocating cycle method and other surfaces which cannot be aligned with the first-named surfaces may be milled by a single cycle method, means being provided for interrupting the reciprocating cycle at points where it is desired to effect an angularly related cyclic movement between the tool support and work support.

Figure 1:
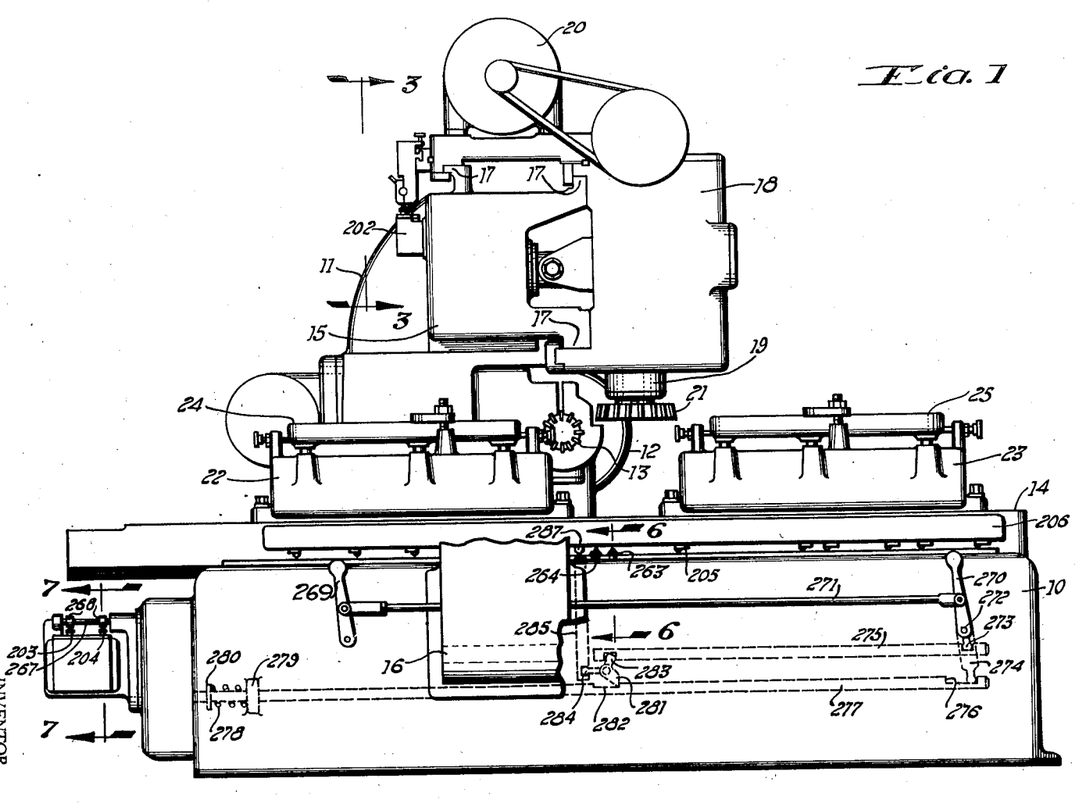
Figure 1 is a view in elevation of a machine tool embodying the principles of this invention.

Referring to Figure 1 the reference numeral 10 indicates a bed of a machine embodying the principles of this invention. From the rear of the bed uprises a column 11 which has suitably formed guideways thereon for supporting a spindle carrier 12 in which a tool spindle is rotatably mounted for driving a cutter 13. A work supporting table 14 is slidably mounted in guideways formed on the top of the bed 10, and above the table is a bridge rail 15 which has one end supported by the column 11, and the other end supported by a bracket 16 attached to the front of the bed and extending upward into engagement with the end of the rail.

The bridge or cross rail 15 has guideways 17 formed thereon for receiving a laterally movable spindle carrier 18. This carrier has a vertical spindle 19 which is driven by prime mover 20 mounted on the carrier for rotating a milling cutter 21. The table is provided with two fixtures 22 and 23 for supporting work pieces 24 and 25.

Figure 2:
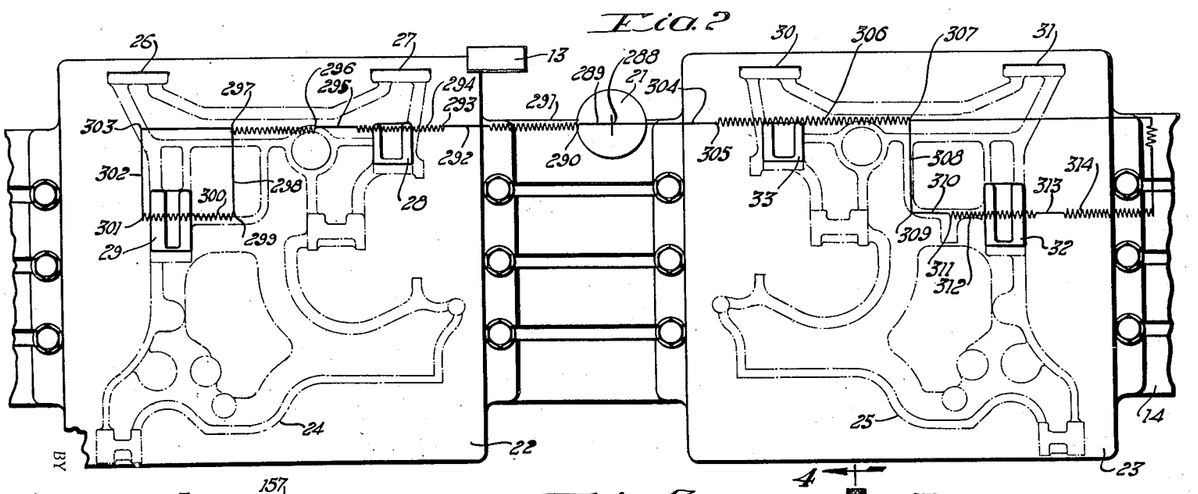
Figure 2 is a plan view of the work support with a diagram of an automatic cycle superimposed thereon.
Figure 15:
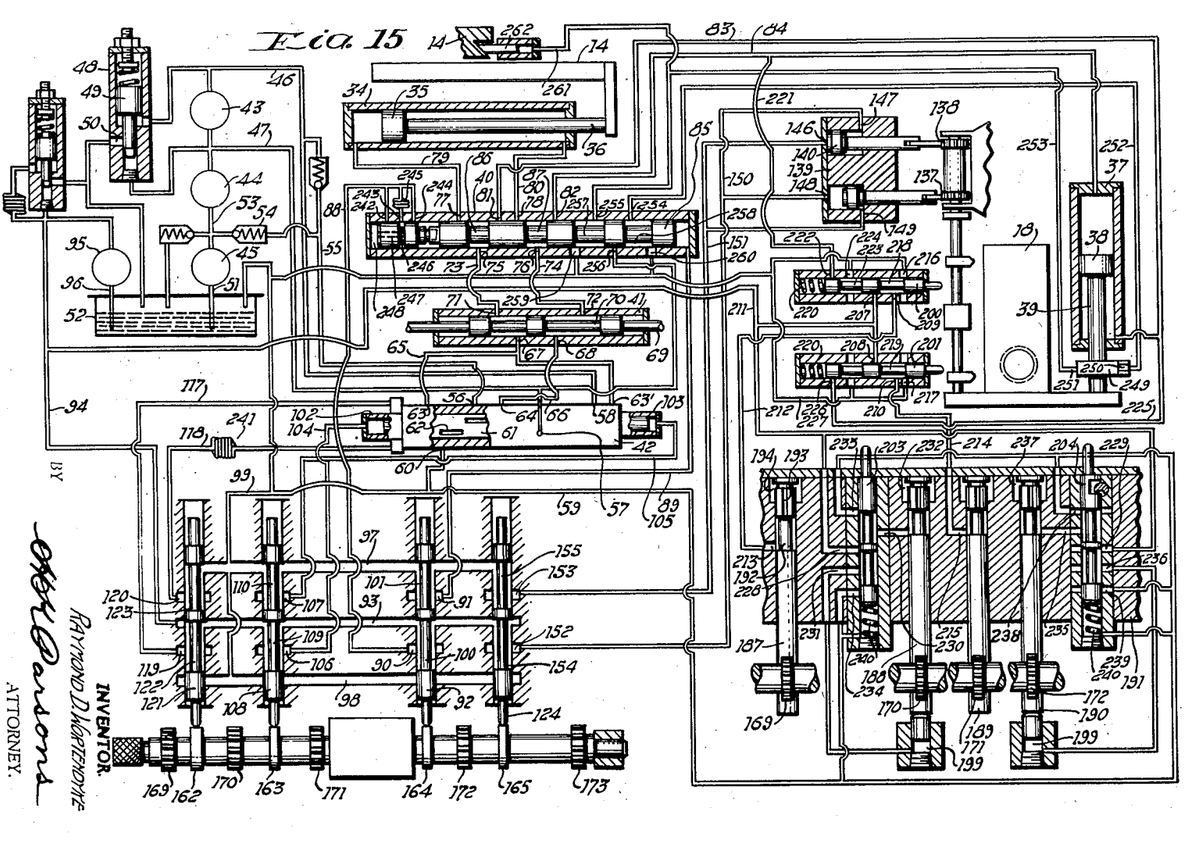
Figure 15 is a diagrammatic view of the hydraulic circuit of the machine.

The work pieces 24 and 25 are right and left hand work pieces as shown in Figure 2 and the work piece 24 has pads or surfaces 26, 27, 28 and 29 to be finished, while the work piece 25 has surfaces 30, 31, 32 and 33 to be finished. The work fixtures hold the work in such position that the surfaces 26 and 27 of work piece 24 and surfaces 30 and 31 of work piece 25 can be milled by the cutter 13 upon reciprocatory movement of the table 14. These surfaces happen to lie in a vertical plane as respects the table but the same results could be accomplished if they all lay in the same horizontal plane. The remaining surfaces 28, 29, 32 and 33 are all finished to the same horizontal plane, but it will be noted that they cannot be arranged in a straight line for engagement by a single cutter during reciprocatory movement of the table and therefore the second spindle carrier 18 carrying the cutter 21 is provided for power movement transversely of the direction of table movement for picking up and finishing these surfaces during longitudinal movement of the table to finish the first-named surfaces. This means that the relative movement between the cutter 21 and the table 14 will describe a rectangular path. Thus, in addition to a reciprocating cycle in which the cutter 13 first mills the surfaces 27 and 26 during movement of the table to the right, and then mills the surfaces 30 and 31 during movement of the table to the left, an additional cycle of relative movement is produced between the cutter 21 and the table 14, the table being stopped during the transverse movements of the cutter 21. In other words, a series of vertical surfaces and horizontal surfaces may be milled in one continuous cycle. An improved transmission and control mechanism shown in Figure 15 is provided for producing such an automatic cycle. This circuit may be divided into an actuating circuit and a control circuit which are independent of one another and are supplied with fluid pressure from separate sources.

The table is actuated by a hydraulic motor in the form of a cylinder 34 and contained piston 35, Figure 15, the piston being connected by a piston rod 36 to the table 14. The cross sliding spindle carrier 18 is similarly actuated by a hydraulic motor consisting of a cylinder 37 and contained piston 38, the piston being connected by a piston rod 39 to the cross slide 18.

The actuating circuit for these two motors comprises, in general, a distributor valve 40, a stop valve 41, a rate and direction selector valve 42 and supply pumps 43, 44 and 45. The pump 43 is a variable delivery pump of any suitable construction and is connected in closed circuit manner by channels 46 and 47 to the selector valve 42 whereby the pump draws fluid from channel 46 which serves as an intake, and delivers fluid under pressure into channel 40. When connected to either motor it will be seen that the pump withdraws fluid from one end of the motor and delivers it under pressure to the other end. In order to make up for leakage losses and to maintain a suitable pressure differential across channels 46 and 47, a differential valve 48 is connected to these channels having a valve piston 49 which is responsive to the pressure in channel 46 to control the opening and closing of port 50 and thus control the escape of fluid from channel 47 to reservoir.

The pump 45 is a rapid traverse pump capable of delivering large quantities of fluid at relatively low pressures and this pump has an intake 51 through which fluid is withdrawn from a reservoir 52 and a delivery channel 53 which is connected through a check valve 54 to channel 55 leading to port 56 of the selector valve 42. The channel 53 also has a branch connection to the intake of a pump 44 which serves as a booster pump to supply leakage losses to the feed pump delivery line 47.

The feed line 47 terminates in a port 57 in the selector valve 42. The channel 46 is connected to port 58 of the selector valve. A channel 59 is connected to port 60 of the selector valve to serve as a return channel for the rapid traverse pump, the channel 59 returning the fluid directly to the reservoir 52.

The selector valve 42 is of known construction and has a rotatable longitudinally movable plunger 61 in which is formed a series of longitudinally extending grooves 62 which are properly positioned about the periphery of the plunger to effect the several connections which determine the rate and direction of movement of the hydraulic motors. The plunger has four positions which are obtained by endwise shifting to two positions and by rotation while in either end position. For instance, when the plunger is shifted to its left hand position it may be rotated counterclockwise to yield a feed left movement of the table or rotated clockwise to yield a quick traverse left movement. If, while the plunger is in a feed left position it is shifted axially without rotation it will yield a quick traverse right movement of the table, and if shifted axially from the quick traverse left position it will yield a feed right movement. In other words, it is possible by merely shifting the plunger axially to change both the rate and direction of the moving element. The various connections that can be effected by the selector valve are diagrammatically illustrated in Figures 10 to 13 of the drawing.

In addition to the various pump ports the selector valve has a pair of ports 63, 63' and a port 64, the first two ports being connected by channel 65 to port 67, and port 64 being connected by channel 66 to port 68 of the stop valve 41. These two channels carry the pressure fluid to and the exhaust fluid from the operating motor, the one carrying the pressure being determined by the selector valve. When it is desired to stop the moving element, the plunger 69 of the stop valve is shifted to the left as viewed in Figure 15 so that the ports 68 and 67 are interconnected by the annular groove 70, thereby short circuiting the operating motor and the ports 71 and 72 are blocked, thereby preventing loss of fluid from channels leading to the motor. The ports 71 and 72 are connected by channels 73 and 74 to ports 75 and 76 of the distributor valve 40.

The function of this valve is to determine which motor is to be operated, thereby preventing simultaneous operation of both motors while still making it possible to utilize a common rate and direction determining actuating circuit for both motors. In accordance with this function the distributor valve 40 has a first pair of ports 77 and 78 which are connected by channels 79 and 80 to opposite ends of the cylinder 34, and a second pair of ports 81 and 82 which are connected by channels 83 and 84 to opposite ends of the cylinder 37. The plunger 85 of this valve has a pair of annular grooves 86 and 87 which, when the plunger is shifted to the left, interconnects the ports 75 and 76 with ports 77 and 78 whereby the table motor will be operated, and when shifted to the right, ports 75 and 76 are connected to ports 81 and 82 whereby the cross slide motor will be operated. It will now be apparent that the distributor valve determines the motor to be operated, while the selector valve determines the rate and direction of movement of the selected motor.

The shifting of the distributor valve plunger and the selector valve plunger is effected hydraulically and a control circuit is provided for this purpose which is separate from the actuating circuit, and supplied with pressure by a separate pump. These positioning movements are effected and controlled in the following manner. The opposite ends of the distributor valve housing 40 are connected by channels 88 and 89 to ports 90 and 91 of a cam operated control valve plunger 92. This plunger is reciprocably mounted in a valve block which has a central pressure bore 93 that is connected by channel 94 to pump 95. This pump has an intake 96 through which fluid is withdrawn from the reservoir 52.

The valve block also has a pair of bores 97 and 98 which are exhaust grooves and connected by passage 99 to reservoir 52. The plunger 92 has a pair of annular grooves 100 and 101 for alternately connecting the pressure groove 93 to ports 90 and 91, the remaining port being connected to one of the exhaust grooves 97, 98 depending upon the direction of movement of the plunger 92.

The selector valve housing 42 has a pair of pistons 102 and 103 mounted in opposite ends of the casing for shifting the selector valve plunger 61. These pistons are connected by channels 104 and 105 to ports 106 and 107 associated with the cam operated control valve plunger 108. This plunger has a pair of annular grooves 109 and 110 for alternately connecting one of these ports to the pressure groove 93 and the remaining port to the exhaust grooves 97, 98 depending upon the direction of movement of the plunger 108.

Figure 14:
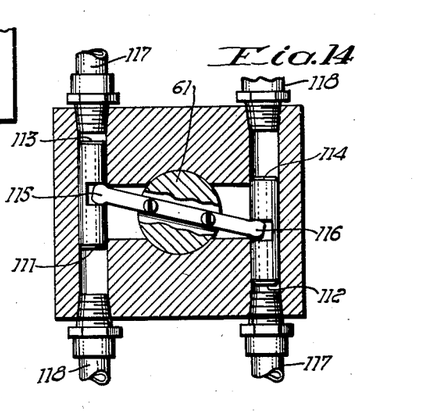
Figure 14 is a section through one end of the selector valve as viewed on the line 14—14 of Figure 10.

The selector valve housing has four additional pistons 111, 112, 113 and 114 mounted therein as shown in Figure 14, the pistons 111 and 113 being integral and the pistons 112 and 114 being integral. The valve plunger 61 has a pair of laterally extending wings 115 and 116, the wing 115 engaging a slot between the ends of pistons 111 and 113, and the wing 116 engaging a slot between the ends of pistons 112 and 114. By subjecting the pistons 112 and 113 to pressure and connecting pistons 111 and 114 to reservoir the valve plunger 61 may be rotated counterclockwise, while if the reverse connections are effected the plunger will be rotated clockwise. These results are obtained by connecting the pistons 112 and 113 to a common channel 117, and connecting pistons 111 and 114 to a common channel 118. These channels terminate in ports 119 and 120 of a third cam operated control valve plunger 121. This plunger has a pair of annular grooves 122 and 123 which serve to alternately connect these channels to the pressure groove 93 and the remaining channel to one of the exhaust grooves 97, 98. Thus, the plunger 121 controls the rotative position of the selector valve, and the plunger 108 controls the axial position of the selector valve.

Figure 3:
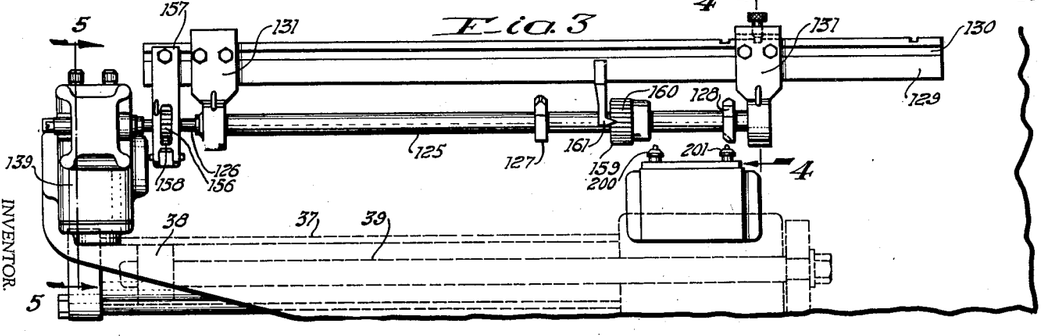
Figure 3 is a view in elevation as viewed on the line 3—3 of Figure 1 showing the trip control mechanism associated with the transversely movable tool support.

A fourth cam operated control valve plunger 124 is mounted in the same valve block with the other control valve plungers and its function is to effect automatic indexing of a dog carrier mounted on the cross slide 18. This dog carrier is shown in Figure 3 and comprises a tube 125 which has a splined bore through which is passed a splined shaft 126. The trip dogs, such as 127 and 128, have a hole in them by which they may be slipped on to the tube and clamped in various longitudinal positions. The splined shaft may be withdrawn from the left hand end of the tube whereby the tube may be removed, and other dog carriers substituted therefor.

Figure 4:
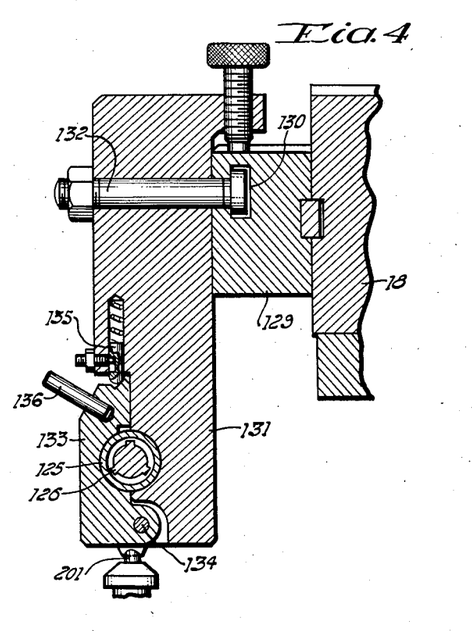
Figure 4 is a detail sectional view on the line 4—4 of Figure 3.

A rail 129 is attached to the rear of the cross slide as shown in Figures 1, 3 and 4, and this rail has a T slot 130 extending longitudinally thereof. Dog carrier support members 131 are fastened to the rail by T bolts 132 as more particularly shown in Figure 4. These support members have divided bearings to facilitate removal of the dog carriers. One-half of the bearing, such as 133, is pivotally supported on a pin 134. A spring-operated latch 135 serves to hold the half-bearing 133 in a closed position to journal the end of the tube 125.

Figure 5:
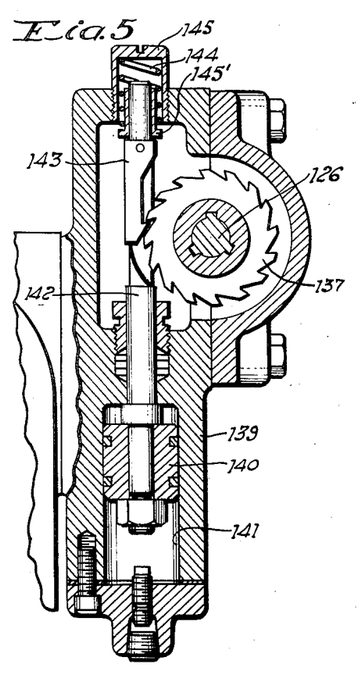
Figure 5 is a sectional view on the line 5—5 of Figure 3.

When it is desired to remove the dog carrier, pressure is applied to the lever 136 which will cause upward movement of the latch and permit the split bearing to be opened. The spline shaft 126 extends through the bore of a pair of ratchet wheels 137 and 138 mounted in a housing 139, Figure 5, which is attached to and movable with the cross slide 18. Separate operating means for each ratchet wheel is provided, one of which is shown in Figure 5. The operating means comprises a piston 140 which is slidably mounted in a cylinder 141.

A piston rod 142 carries a pawl 143 arranged in tangential relation to the periphery of the ratchet wheel whereby upon upward movement of the piston as shown in Figure 5, the ratchet wheel will be indexed and upon downward movement the ratchet pawl 143 will pick up the next tooth. A spring 144 enclosed in a thimble 145 surrounds a shouldered sleeve 145' mounted on the upper end of the piston rod and serves to effect a constant downward pressure on the piston rod and maintains the pawl in engagement with the ratchet teeth. Sole reliance is not placed on the spring to effect return movement of the piston, but the piston is positively operated in both directions by hydraulic pressure.

Referring to Figure 15, one cylinder has ports 146 and 147 while the other cylinder has ports 148 and 149. The ports 147 and 148 are connected to a common channel 150, and the ports 146 and 149 are connected to a second channel 151.

It will be evident from this that upon admission of pressure to either channel the pistons 140 will be simultaneously actuated in opposite directions. This will cause one ratchet to effect indexing while the other ratchet pawl is returning to pick up the next tooth. The channels 150 and 151 terminate in ports 152 and 153 associated with the valve plunger 124. The plunger has annular grooves 154 and 155 for connecting one of the ports to the pressure groove 93 and the other port to one of the exhaust grooves 97, 98. Thus, regardless of which direction the plunger 124 is moved, it will effect an indexing of the dog carrier.

The spline shaft 126 shown in Figure 3 carries a detent wheel 156 which is mounted in a bracket 157 depending from the rail 129 and in this bracket is a spring-pressed detent 158 which serves to hold the parts in indexed position. The dog carrier also has mounted thereon an indicator wheel 159 which carries graduations 160 which are equal in number to the number of indexible positions of the dog carrier. A depending pointer 161 is associated with the indicator wheel to indicate the position of the carrier. The graduations are usually numbered and the dog carrier must complete one revolution during one complete cycle of the machine.

Figure 8:
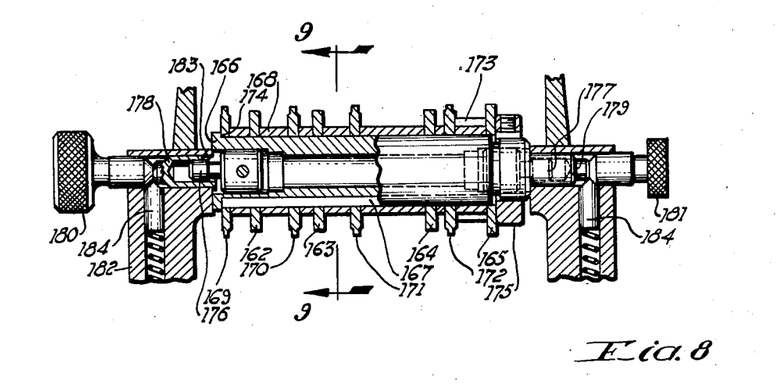
Figure 8 is a sectional view on the line 8—8 of Figure 7.

It should now be evident that the operation of the entire machine is controlled by the four valves 121, 108, 92 and 124, these valves determining the slide to be moved, the rate and direction of that movement and the nature of the cycle which the cross moving carrier is to execute. For controlling the simultaneous position of these valves a cycle control unit which is more particularly shown in Figure 8 is provided and this unit includes a control cam individual to each valve. These cams are indicated by the reference numerals 162, 163, 164 and 165 in Figures 8 and 15, and control the position of plungers 121, 108, 92 and 124 respectively.

The cams are keyed on a drum 166 by a long spline 167. Spacers indicated generally by the reference numeral 168 are utilized to position the cams in suitable spaced relation longitudinally of the drum. The drum also carries a series of ratchet wheels 169, 170, 171 and 172 which are also keyed on the drum. The drum is provided with a detent wheel 173. All of these parts are clamped to the drum between a shoulder 174 on one end, and a clamping ring 175 on the other end. Once this cycle control unit is made up and assembled to suit a particular machine cycle it is not disassembled, the intention being that for a different cycle, a different cycle control unit is made up and inserted in place of the present one.

Means are, therefore, provided whereby this unit may be removed and other units substituted. This is accomplished by providing opposite ends of the drum with axial projecting journal portions 176 and 177, and providing axially shiftable thimble bearings 178 and 179 in the bed of the machine which may be pulled axially by knurled knobs 180 and 181 for releasing the journals, the support 182 being cut away at 183 to permit withdrawal of one end of the drum. Detent plungers 184 serve to lock the parts in position.

Figure 9:
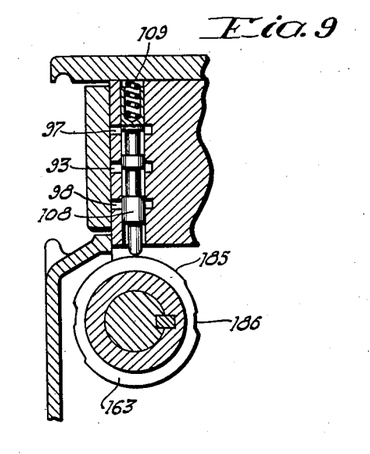
Figure 9 is a section on the line 9—9 of Figure 8 showing one of the control cams in elevation.
Figure 10:
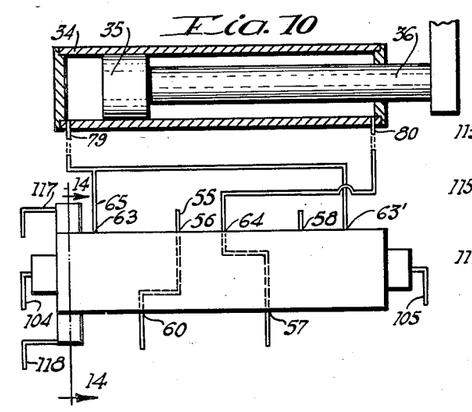
Figures 10-13 inclusive are diagrammatic views showing the various hydraulic connections that can be effected by the selector valves.
Figure 11:
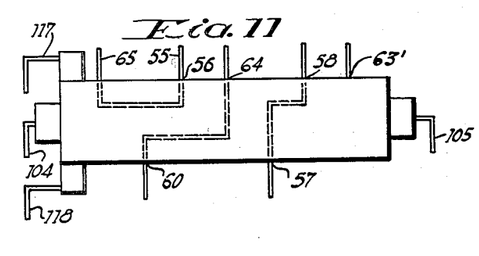
Figure 12:
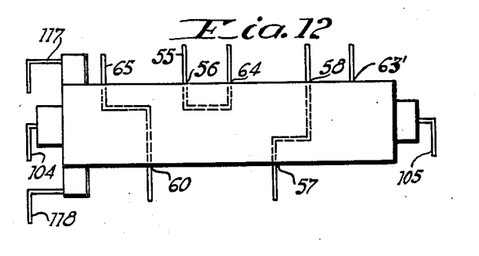
Figure 13:
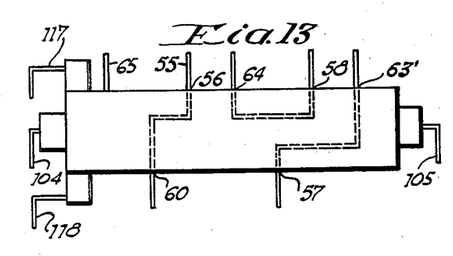

A cross section through one of the control valves and its control cam is shown in Figure 9. This shows the cam 163 and the plunger 108 which is held in engagement with the periphery of the cam by a spring 109. The cam is provided with eminences indicated generally by the reference numeral 185 which determine the upper position of the plunger, and depressions such as 186 which determine the lower position of the plunger. In cases where the plunger has a central or neutral position the cam is provided with a surface which is half-way between the eminence and the depression. The ratchet wheels which all have the same number of teeth determine the number of stops or positions that the cycle control unit has for a complete revolution, and this number is determined by the number of steps necessary to machine a given piece of work.

Thus, each change in rate or direction or transfer of motion from one slide to the other constitutes a step in the cycle and requires an indexing of the cycle control unit. This indexing is effected by a series of fluid operable ratchet plungers which are controlled by dog operated pilot valves. Referring to Figure 15, the ratchet wheels are provided with fluid operable ratchet plungers 187, 188, 189 and 190.

These plungers are reciprocably mounted in a block 191 and each has an annular groove 192 formed near the upper end thereof which is connected by a longitudinally extending groove 193 to a chamber or cylinder 194. Thus, by admitting pressure to the annular groove 192 the fluid will flow through the groove 193 to the chamber 194 and cause downward movement of the ratchet plunger.

Figure 7:
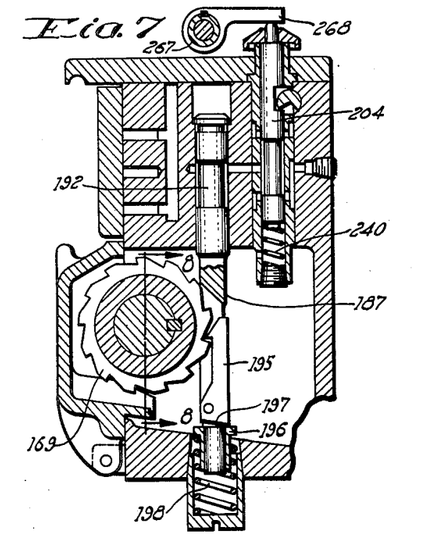
Figure 7 is an enlarged sectional view taken on the line 7—7 of Figure 1.

The specific details of one of these plungers are shown in Figure 7, where it will be noted that the plunger, such as 187, is provided with a ratchet pawl 195 that is adapted to engage the teeth of the ratchet wheel 169. A shouldered bushing 196 is slidably mounted on the end of the plunger for engagement with the beveled end 197 of the ratchet pawl and continued pressure on the bushing by a spring 198 maintains the pawl in engagement with the periphery of the ratchet wheel 169. The spring also serves to effect return movement of the plunger when the upper chamber is connected to reservoir.

In the case of plungers 188 and 190 as shown in Figure 15 reliance is not placed on springs to effect return movement, but rather the lower ends of the plungers are provided with additional cylinders 199 to insure positive return movement thereof. Each plunger has its own pilot control valve, the plungers 187 and 189 being controlled by the pilot valve plungers 200 and 201 which are associated with the cross slide and are supported in a valve block 202 attached to the column as shown in Figure 1. The plungers 188 and 190 are controlled by pilot valve plungers 203 and 204 which are mounted on the end of the bed of the machine as shown in Figure 1 for remote control by table dogs, indicated generally by the reference numeral 205 and mounted on a removable dog rail 206. The dogs 205 are suitably spaced along the dog rail 206 in accordance with a desired cycle and when the cycle is changed, the dog rail and dogs are removed as a unit from the table of the machine and a new dog rail substituted.

The trip operated pilot valve plungers 200 and 201 control the connection of pressure ports 207 and 208 to ports 209 and 210 respectively. The pressure ports 207 and 208 are supplied with pressure by pump 95 through channel 211. The port 209 is connected by channel 212 to port 213 associated with the ratchet plunger 187 whereby the fluid will flow through the annular groove 192 and the longitudinal groove 193 to the cylinder 194 forcing the ratchet plunger 187 downward. The port 210 is connected by a channel 214 to port 215 associated with ratchet plunger 189 whereby upon flow of fluid pressure to this port the plunger 189 will be similarly actuated.

The ports 209 and 210 are normally connected to exhaust ports 216 and 217 respectively by the annular grooves 218 and 219 in the plungers 200 and 201. Springs 220 normally hold these plungers in the position shown in Figure 15 with the obvious result that as soon as the operating dog passes out of engagement with the plunger it immediately returns to its normal position, releasing the pressure on the ratchet plungers 187 and 189 allowing the springs associated with these plungers to immediately return them, which is possible because the return movement of these plungers is an idle stroke.

Means are provided for obtaining a quick response to dog actuation of either plunger 200 or 201, especially for stopping purposes. This means consists of utilizing these plungers to make by-pass connections to reservoir of the supply lines to cylinder 37 whereby the operating pressure is immediately reduced while awaiting response of the cycle control mechanism. In other words, the supply channel 84 for one end of cylinder 37 has a branch connection 221 to port 222 which is normally closed by the plunger 200.

When this plunger is shifted an annular groove 223 in the plunger connects port 222 to an exhaust port 224. Similarly, the supply line 83 to the other end of cylinder 37 has a branch connection 225 to port 226 which is connectable by the plunger 201 to exhaust port 227. It is obvious that both plungers produce, upon dog actuation, the same result, that is, indexing of the cycle control unit.

Attention is invited to the fact that the plungers 200 and 201 lie in offset planes which are parallel to the direction of cross slide movement whereby each plunger may have its own set of operating dogs lying in the respective planes. For simple cycles, only one plunger and associated dogs need be used. For more complicated cycles both plungers, together with latch dogs, are used, one set of latch dogs being effective on one plunger during one direction of movement and a second set of latch dogs being effective on the other plunger during the other direction of movement.

The plungers 203 and 204 controlled from the table are in the form of reversing valves having central pressure ports 228 and 229 respectively which are supplied with pressure from branches of channel 211 supplied by pump 95. The plunger 203 has ports 230 and 231 which are connected by channel means to cylinders 232 and 199 located at opposite ends of the ratchet plunger 188. A pair of exhaust ports 233 and 234 are also associated with the plunger 203 whereby, when one of ports 230, 231 is connected to pressure, the other is connected to exhaust. Similarly, the plunger 204 has a pair of ports 235 and 236 associated therewith which are connected by channel means to cylinders 237 and 199 located at opposite ends of ratchet plunger 190. A pair of exhaust ports 238 and 239 make it possible to connect one of the ports 235, 236 to reservoir when the other is connected to pressure.

The plungers 203 and 204 are normally held in the position shown by springs 240 and these springs serve to return the plungers to this position as soon as the actuating dog has released them.

Figure 6:
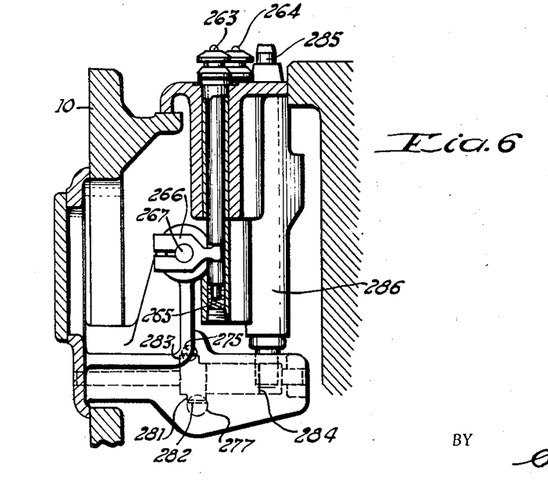
Figure 6 is an enlarged sectional view taken on the line 6—6 of Figure 1.

The valve plungers 203 and 204 are remotely controlled by the table dogs through the means of the following described linkages. As shown in Figure 6, a pair of trip plungers 263 and 264 are reciprocably mounted in the bed 10 adjacent the side of the table and about midway of the length of the bed as shown in Figure 1. A spring 265 associated with each plunger, holds the plunger in an upper position. A crank arm 266 connects the plunger to a rock shaft 267. The rock shafts extend beyond one end of the bed where they are provided with tappets 268, one of which is shown in Figure 7 for actuating plunger 204. Thus each valve plunger has its own trip mechanism.

The trip plungers 263 and 264 are mounted in different planes parallel to the direction of table movement for the same reasons as described in connection with plungers 201 and 202.

When the cycle control unit is indexed, it will be obvious that all of the control valve plungers, which are shifted by that indexing movement, will assume their new positions simultaneously. Certain of the fluid operable devices controlled thereby, however, operate easier than others, and therefore, would complete their movement earlier. This might cause complications.

For instance, if while the cross slide were moving at a feed rate, the distributor valve and the selector valve were shifted for the purpose of stopping the cross slide and starting the table, it will be obvious that if the selector valve completed its movement before the distributor valve reached a midposition that a short rapid traverse movement would be imparted to the cross slide which would carry it beyond its intended stop position.

A resistance 241 is, therefore, inserted in one of the channels, such as the channel 118 leading to the selector valve, for retarding the flow of fluid to or from the actuating pistons, depending upon whether the line 117 or 118 is the pressure line, and thereby retard the rotary movement of the selector valve.

In addition, means are provided whereby the distributor valve will move rapidly to a central position regardless of which direction it is being shifted, and close all outgoing lines to the various operating cylinders; and then move at a slow rate to give the selector valve time to complete its shifting movement and thereby set up the new rate before one of the hydraulic motors is connected thereto. This effect is accomplished by connecting the line 88 to three ports, 242, 243 and 244, located in one end of the distributor valve housing.

The middle port of the three is connected to the line 88 through a hydraulic resistance 245. The distributor valve plunger 85, although never resting in a central position during operation of the machine, is shown in a central position in Figure 15 to clarify the explanation. It will be noted that in this central position the port 243 is in registry with an annular groove 246 formed in the plunger 85 and this groove communicates through interdrilling 247 with the chamber or cylinder 248 located in the end of the housing 40. It will now be obvious that if fluid pressure is flowing through the line 88, that the resistance 245 will retard the flow of fluid to the chamber 248 and the plunger 85 will move slowly from its central position toward the right.

Conversely, if the pressure is supplied to channel 89, the fluid being exhausted from chamber 248 will flow slowly through the resistance 245 and retard the movement of the plunger from its central position to the left.

When the plunger 85 is to the extreme right the port 244 will be in registry with the annular groove 246, thereby permitting free exhaust of the fluid from chamber 248 during the initial movement of the plunger toward the left until the port 244 is closed. This enables the plunger 85 to be shifted quickly to its center position from the right. When the plunger 85 is to the extreme left, the port 242 is in registry with the annular groove 246, thereby permitting free access of the fluid from channel 88 to the chamber 248, causing rapid movement of the plunger from the right to its center position until the port 242 closes. Thus, regardless of the direction of shifting of the distributor valve plunger it should be obvious that it will move rapidly to its central position in which all channels leading to the operating motors are closed, and then continue at a slow rate permitting the rotary shifting of the selector valve to be completed before the distributor valve completes its movement and opens the channels to the selected motor.

Figure 16:
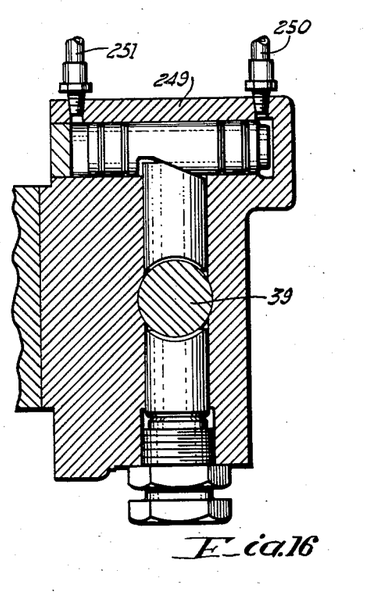
Figure 16 is a section through the hydraulic brake for the cross slide.

The distributor valve also serves another function and that is to apply a hydraulic brake to the selected slide which is to remain at rest. The cross slide has a hydraulic brake, indicated generally by the reference numeral 249 in Figures 15 and 16, and this brake has a pressure port 250 through which fluid pressure is supplied to effect application of the brake, and a port 251 through which pressure is supplied to release the brake. These ports are connected by channels 252 and 253 to ports 254 and 255 located in the distributor valve housing. A pressure port 256 is also provided in this housing, the port being supplied with fluid pressure from the feed pump 43. The valve plunger 85 is provided with annular grooves 257 and 258 for alternately connecting the pressure port to ports 254, 255, and the remaining port to one of the exhaust ports 259, 260. The channel 253 which supplies the pressure to unlock the brake on the cross slide has a branch connection 261 to a brake operating piston 262 for the table. Thus, by merely connecting pressure to channel 253 the table brake is applied and the brake on the cross slide is released.

The start and stop valve is utilized for manually starting the machine, and automatic means in addition to the manual means are provided for shifting the valve to a stop position.

The manual control mechanism includes two manually operable levers 269 and 270 pivotally mounted on the front of the machine as shown in Figure 1 and connected together for joint operation by a connecting rod 271. The lever 210 is fixed to its supporting shaft 272, and this shaft in turn has connected to it on the inside of the bed a pair of ball-ended levers 273 and 274. The lever 273 engages a notch in a rod 275 while the lever 274 engages an elongated notch 276 formed in the end of the stop valve shifter rod 277. The shifter rod 277 is connected to the end of the stop valve plunger 69 and a spring 278 interposed between an abutment 279 on the bed and a washer 280 fixed with the rod 277 serves to normally urge the stop valve to its stop position.

Latch means are provided for holding the valve in a running position and this comprises a latch pawl 281 which is adapted to drop into a notch 282 formed on the rod 277 when same is shifted to the right by counterclockwise rotation of the start and stop lever 270. The latch pawl is integral with a pair of ball-ended levers 283 and 284, the latter engaging a notch in a stop valve plunger 285. This plunger is reciprocably mounted in a sleeve 286 as shown in Figure 6 and is adapted to be depressed by a trip dog 287 which may be attached to the dog rail 206. When the dog depresses the trip plunger 285, the latch pawl 281 is withdrawn from the notch 282 and the spring 278 shifts the valve to a stop position. The ball-ended lever 283 engages a notch in the rod 275 whereby rotation of the manual control lever 270 in a clockwise direction will also effect release of the latch pawl 281.

The lost motion in the notch 276 permits this movement of the lever 270 although the rod 277 is held in a fixed position by the latch. The stop dog 287 is usually located in a mid-position so as to effect automatic stopping of the machine when the cutters are midway between two fixtures.

The cutters 13 and 21 in Figure 2 are shown in their relative position with respect to the table and work fixtures when the table has been automatically stopped by the automatic stop mechanism. It is to be remembered that the automatic stopping of the machine does not in any way effect the cycle control mechanism nor affect the rate and direction determined thereby at the time of stopping.

Therefore, when the stop valve is shifted to a running position, the part that was moving will start to move again at the same rate and direction that it had before stopping.

An illustrative cycle diagram has been superimposed on Figure 2 and in this diagram straight lines indicate rapid traverse movements, and wavy lines indicate feed movements. Since the parts are shown in midposition in Figure 2, the cycle may start in either direction from this position. For explanatory purposes it will be assumed that when the stop valve is shifted the table will be moved toward the right which is equivalent to saying that the table is stationary and the cutters are moving toward the left. The diagram indicates the path of relative movement between the cutters and the work. The point 288 on the diagram indicates the starting position for the cutter 21 and if the table moves toward the right the cutter may be assumed to move toward the left at a rapid traverse rate as indicated by the line 289.

At the point 290 a trip dog will effect indexing of the cycle control mechanism to change the rate to a feed rate because the cutter 13 is about to engage the surface 27. The wavy line 291 indicates the length of the feeding movement necessary for the cutter 13 to mill the surface 27. The rate then changes to rapid traverse as indicated by the line 292 at the end of which the cutter 21 is ready to engage the surface 28 and, therefore, at the point 293 the rate changes to a feed rate, the length of which is indicated by the wavy line 294.

After the surface 28 has been milled, another rapid traverse movement, indicated by the line 295, occurs, and at 296 the rate changes back to feed because the cutter 13 is now about to mill the surface 26. The milling operation on this surface will be completed at the point 297 where indexing of the cycle control mechanism will now stop the movement of the table and start movement of the cross slide 18 at a rapid traverse rate as indicated by the line 298. The next indexing of the cycle control mechanism which occurs at point 299 in the diagram will stop the cross slide and start the table again at a feed rate as indicated by the line 300 during which time the cutter 21 will mill the surface 29. When this has been completed the cycle control mechanism will be indexed at the point 301 in the diagram to stop the table and effect return of the cross slide 18 at a rapid traverse rate as indicated by the line 302. At the point 303 the cross slide will stop and the table will move to the left at a rapid traverse rate until it reaches the point 288 at which the trip dog 287 will stop the machine.

During the machining of the work in the fixture 22 the operator will be loading the fixture 23 and the automatic stop serves as a safety feature to prevent initiation of the cutting cycle on the new work piece until the operator has determined that the cycle is ready to begin. When he does shift the stop valve to a running position the table will move at the same rate and direction as it previously had and which is indicated by the line 304. At the point 305 in the cycle diagram, the rate will change to feed whereby the cutter 21 will mill the surface 33 and the cutter 13 will mill the surface 30 in succession.

The length of this feeding movement is indicated by the wavy line 306 and at the point 307 the cycle control mechanism stops the table and initiates movement of the cross slide 18 at a rapid traverse rate, the length of which is indicated by the line 308.

At the point 309 the cross slide stops and the table again moves at a rapid traverse rate, as indicated by the line 310, until the cutter 21 is about to engage the surface 32 when the rate changes to feed at the point 311. The wavy line 312 indicates the length of the feeding movement necessary for the cutter 21 to mill the surface 22 after which the rate changes to rapid traverse, as indicated by the line 313, until the cutter 13 is about to engage the surface 31. The rate then changes to a feed rate, as indicated by the line 314, and after this surface is milled the parts return to the starting position indicated by the point 288.

There has thus been provided an improved transmission and control mechanism for a milling machine having an improved cycle control mechanism which can produce various patterns of two directional movements between a tool support and a work support including a common rate and direction control mechanism for either one of the two movements.

I claim:

1. A machine tool having a plurality of fluid operable devices for effecting relative movement between a work support and tooling means for work carried by the support, channel means for delivering fluid under pressure to said devices and simultaneously conveying exhaust fluid therefrom, valve means for selectively connecting fluid at a feed rate or rapid traverse rate to said channel means, other valve means for connecting said channel means selectively to said fluid operable devices, and means to individually or jointly adjust either or both of said selective valve means to change the rate of the operating device or stop one device and start the other.

2. In a machine tool having a work support, a first tool support and a second tool support, the combination of a first fluid operable motor for effecting relative movement between the work support and the first tool support, a second fluid operable motor for effecting relative movement between the work support and the second tool support, a control circuit for said motors including a pair of channels, a distributor valve for selectively connecting said pair of channels to one of said motors, a feed pump, a rapid traverse pump, valve means for selectively connecting the output of said pumps to either one of said channels to produce different rates and directions of motor actuation, and a station to station cycle control means having motion transmitting connections with said valves for potential shifting thereof at each station in the cycle, and means for determining the valve means to be shifted at each station.

3. In a machine tool having a work support, and a pair of tool supports, the combination of a first fluid operable motor for effecting relative movement in one plane between the work support and tool supports, a second fluid operable motor for effecting relative movement in a second plane between the work support and one of said tool supports, a hydraulic control circuit for said motors including various pump means and a plurality of shiftable valves for determining the motor to be actuated, and its rate and direction of actuation, a station to station cycle control means having motion transmitting connections with each of said shiftable valves, and means for determining the valves to be shifted at each station.

4. In a machine tool having a work support and a pair of tool supports, the combination of a first fluid operable motor for shifting the work support, a second fluid operable motor for shifting one of said tool supports, a control circuit for said motors including means for supplying fluid pressure at a feed rate or a rapid traverse rate, valve means for alternatively connecting the motors to said circuit, a common rate and direction control valve means for said motors, fluid operable devices for shifting said valve means, a station to station cycle control means having channel connections to all of said fluid operable devices, an independent source of pressure for supplying fluid to said channels, and pilot valve means controlled by said cycle control means for determining the channels to be connected to said independent source of pressure at each station of said cycle control means and thereby determine automatic operation of said machine.

5. In a machine tool having a work support and a pair of tool supports, the combination of a first fluid operable motor for effecting relative movement between the work support and said tool supports, a second fluid operable motor for effecting relative movement between one of said tool supports and the remaining supports, means to supply fluid under pressure to said motors at a feed rate or a rapid traverse rate, a first valve means for determining the rate and direction of motor actuation, a second valve means for determining the motor to be actuated, a plurality of fluid operable devices for shifting said valve means to their various positions, a station to station cycle control means including a series of pilot valves for controlling actuation of said fluid operable devices, and means for determining actuation of said pilot valves at each station of said cycle control means.

6. In a machine tool having a work support and a pair of tool supports, the combination of a first fluid operable motor for effecting relative movement of the work support with respect to said tool supports, a second fluid operable motor for effecting movement of one of said tool supports transversely of the work support, fluid pressure supply means for alternatively actuating said motors at a feed rate or a rapid traverse rate, a distributor valve for selectively connecting said motors to the supply means, rate and direction control valve means interconnected between said supply means and said distributor valve means, a series of fluid operable devices for shifting said valve means to determine the motor to be actuated and its rate and direction of actuation, pilot valve means for each of said fluid operable devices, a station to station cycle control means including means for determining the position of each of said pilot means at each station of the cycle, and means trip operable from any moving support to effect indexing of said cycle control means.

7. In a milling machine having a work support and a pair of tool supports, the combination of a fluid operable motor for traversing said table whereby spaced parallel cutting paths may be created, a second fluid operable motor for effecting a relative shifting movement between said supports to change the spacing of said cutting paths, a source of fluid pressure for said motors, valve means connecting said source of pressure to one of said motors, and means trip operable by the table for disconnecting said source of pressure from one motor and connecting it to the other motor when changes in the spacing of said cutting paths is desired.

8. A milling machine having a work support and a pair of tool supports, the combination of means for effecting a traversing movement of said table relative to said tool supports to create spaced parallel cutting paths including a fluid operable motor, a source of fluid pressure, valve means for determining the rate and direction of table movement effected by said motor, a second fluid operable motor for effecting a relative adjustment between said supports to change the spacing of said cutting paths, means automatically trip controlled by the moving table to disconnect said valve means from the first-named motor to stop the table and connecting them to the second fluid operable motor to change the spacing of said cutting paths, and means trip operable by the moving tool support for stopping said adjusting movement and reestablishing movement of the tbale.

9. In a milling machine having a tool support and a work support, the combination of means for effecting relative movement between the supports to mill a series of aligned work surfaces, a second tool support mounted for lateral adjustment with respect to the work support, trip operable means for stopping said relative movement and effecting lateral adjustment of the second tool support for alignment with work surfaces inaccessible to the tool of the first tool support, and means trip operable by the second tool support for stopping movement thereof and initiating relative movement of the work support.

10. In a milling machine, the combination of of a work support, a tool support, power operable means for feeding the work support, means to effect a bodily shifting of the tool support relative to the work support, means for stopping the movement of the work support during said shifting, trip operable means associated with the tool support for controlling the rate and length of movement thereof, an indexible dog carrier mounted on the tool support for carrying different series of trip dogs, and means for indexing said dog carrier automatically whereby the tool support may execute a series of different cyclic movements during one direction of movement of said work support.

11. In a milling machine having a work support and a tool support, the combination of means for effecting relative movement between the supports in transverse paths, separate motors for effecting movement in each path, a common control circuit for said motors including a source of fluid pressure, a pair of channels, a distributor valve for alternately connecting said channels to said motors, valve means for changing the rate and direction of fluid flow through said channels and thereby the rate and direction of the connected motor, fluid operable means for shifting said valves, a series of pilot valves therefor, trip operated means for determining the position of said pilot valves, and means for retarding the shifting of said distributor valve after it has reached a position for stopping the actuated motor.

12. In a milling machine having a work support and a tool support and separate fluid operable motors for each support whereby angularly related paths of relative movement between said supports may be created, the combination of a power control circuit for said motors including a feed pump, a rapid traverse pump, a distributor valve having a pair of ports, valve means for selectively connecting said pumps to said ports to determine the rate and direction of actuation of the selected motor, said distributor valve having a shiftable plunger for connecting said ports alternately to said motors for selective actuation thereof, a pilot control circuit including fluid operable means for shifting said valves, a trip operable pilot valve for determining the fluid operable means to be actuated, and means in said circuit for retarding final movement of the distributor valve to a new position until said valve means have been finally positioned.

13. A machine tool having a pair of fluid operable supports, a source of fluid pressure, a control circuit for determining the rate and direction of fluid supplied to said supports, said circuit terminating in a distributor valve having a shiftable plunger for alternately connecting said circuit to one of said supports for several actuation thereof, a fluid operable brake for clamping one of said supports and having a single supply line, a fluid operable brake for the other support having a pair of lines connected thereto, one of which is a branch connection of the first-named line, and means in said distributor valve for alternately connecting pressure to said lines.

14. In a machine tool having a plurality of fluid operable devices, the combination of a pair of channels, means to supply fluid pressure alternately to said channels and selectively at a feed rate or a rapid traverse rate, means to selectively connect said channels to one of said fluid operable devices, fluid operable means for shifting said selective means, pilot valves for each of said fluid operable means, and means to simultaneously actuate said pilot valves.

15. In a machine tool having a support and a pair of alternatively power operable slides mounted thereon for executing various cutting paths, the combination of a source of power, a selector alternatively positionable for connecting said source of power for sequential operation of said slides, individual power operable brakes for the respective slides, and means operable by said selector for automatically releasing the brake on a slide and simultaneously connecting power thereto.

16. In a milling machine having a bed, a milling cutter rotatably supported thereby for cutting in a vertical plane, a second cutter rotatably supported thereby for cutting in a horizontal plane, and a table having fixtures mounted thereon for holding work having surfaces in both planes to be finished, the combination of power operable means for feeding the table relative to said cutters to finish surfaces in both planes, automatic means for stopping the table and shifting one of said cutters laterally to establish a new cutting path for milling surfaces not lying in the original cutting path of the said cutter, and means responsive to the completion of said shifting movement to reestablish movement of the table.

17. In a milling machine having a plurality of cutter supports and a work support, the combination of a fluid operable transmission and control means for effecting a relative feeding movement between the work support and the tool supports in a direction lengthwise of the table and other relative movements between one of said cutter supports and the work support crosswise of the table including a fluid shiftable distributor valve, a fluid shiftable rate and direction valve means, and a fluid indexible dog carrier, in dividual reversible pilot valves for each of the fluid operable devices, control cams for the respective pilot valves, a common shaft for supporting said cams in operative relation to the respective valves, a plurality of hydraulically actuated ratchets for indexing said cam shaft, pilot valves individual to the movable supports for controlling actuation of said ratchets, and means carried by said supports, one of which includes said dog carrier for operating said last-named pilot valves.

18. In a milling machine having a work support and a plurality of tool supports, the combination of means for effecting sequential movements between said supports in an automatic cycle including a first control device for determining the support to be operated, a second device for determining the rate and direction of said operation, a common station to station cycle control means for all of said devices, power operable means for indexing said cycle control means from one station to the next, and means associated with each movable support to effect trip operation of said power operable indexing means.

19. In a machine tool having a work support and a pair of tool supports, the combination of a first motor for effecting relative movement in one plane between the work support and tool supports, a second motor for effecting relative movement between said supports in a second plane, the combination of control means for said motors including a source of energy therefor, a plurality of shiftable devices for determining the motor to be connected to said source of energy and its rate and direction of actuation, a station to station cycle control means having motion transmitting connections with each of said shiftable devices, and parts in said cycle control means for determining the devices to be shifted at each station.

20. An automatic production milling machine for milling a series of bosses located on angularly related surfaces of a work piece, the bosses on one of said surfaces being in misalignment relative to the direction of movement of the table comprising a table for supporting one or more of said work pieces, the combination of means for supporting a cutter for rotation in the finished plane of the bosses lying on one of said surfaces, a second cutter supported for rotation in a finished plane to be produced on the bosses in the second surface, power operable means for feeding the table and thereby creating cutting paths for each of said cutters whereby bosses in both surfaces may be simultaneously milled, trip operable means adapted to be positioned to effect stoppage of the table and shifting of one of said tool supports for alignment of the cutter with a boss not lying in its original cutting path, and other trip operable means for effecting return of the movable cutter to its original cutting path after said milling operation has been completed

RAYMOND D. WORTENDYKE.